(12) United States Patent
Hattori et al.

(10) Patent No.: US 11,704,368 B2
(45) Date of Patent: Jul. 18, 2023

(54) BOOK SEARCH INTERFACE APPARATUS, BOOK SEARCH METHOD, AND PROGRAM

(71) Applicant: NIPPON TELEGRAPH AND TELEPHONE CORPORATION, Tokyo (JP)

(72) Inventors: Takashi Hattori, Tokyo (JP); Tessei Kobayashi, Tokyo (JP); Sanae Fujita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/973,729

(22) PCT Filed: May 20, 2019

(86) PCT No.: PCT/JP2019/019834
§ 371 (c)(1),
(2) Date: Dec. 9, 2020

(87) PCT Pub. No.: WO2019/239796
PCT Pub. Date: Dec. 19, 2019

(65) Prior Publication Data
US 2021/0248190 A1 Aug. 12, 2021

(30) Foreign Application Priority Data
Jun. 12, 2018 (JP) .................. 2018-111706

(51) Int. Cl.
*G06F 16/9032* (2019.01)
*G06F 16/9038* (2019.01)

(52) U.S. Cl.
CPC .... *G06F 16/90332* (2019.01); *G06F 16/9038* (2019.01); *G06F 16/90328* (2019.01)

(58) Field of Classification Search
CPC .... G06F 16/00; G06F 16/332; G06F 16/9038; G06F 16/90328
See application file for complete search history.

(56) References Cited

U.S. PATENT DOCUMENTS 7,720,683 B1* 5/2010 Vermeulen .............. G10L 15/22
704/235
2002/0116183 A1* 8/2002 Waryas .................... G09B 5/06
704/209

(Continued)

FOREIGN PATENT DOCUMENTS

JP 2002-132786 A 5/2002
JP 2017-129901 A 7/2017

*Primary Examiner* — Taelor Kim

(57) ABSTRACT

Provided is a technique for effectively searching for a book for an articulation disordered-child to use in practice. A search condition setting unit 120 sets a search condition for a speech sound in accordance with a selection state of kana symbol buttons disposed in a book search screen, the kana symbol buttons corresponding one-to-one to kana symbols indicating respective speech sounds. A search unit 130 searches for a book in which a desired speech sound appears, in accordance with the search condition. A book search screen includes at least one of a Japanese syllabary button group in which the kana symbol buttons are classified as vowels or consonants, and an articulation button group in which the kana symbol buttons are classified by articulatory organ and articulation manner.

8 Claims, 11 Drawing Sheets

(56) References Cited

U.S. PATENT DOCUMENTS

| 2007/0105074 | A1* | 5/2007 | Maslen | G09B 1/36 |
| | | | | 434/171 |
| 2009/0225034 | A1* | 9/2009 | Kida | G06F 3/0238 |
| | | | | 345/171 |
| 2012/0004901 | A1* | 1/2012 | Nakano | G06F 40/129 |
| | | | | 704/E15.02 |

* cited by examiner

OPTION AREA DISPLAY EXAMPLE 1

- TEXT TYPE — 3071
  - ※HIRAGANA  ※KATAKANA  ※KANJI  ※KANJI W/ READINGS
- IN-WORD APPEARANCE LOCATION — 3072
  - ※START OF WORD  ※MIDDLE OF WORD  ※END OF WORD
- IN-SENTENCE APPEARANCE LOCATION — 3073
  - ※START OF SENTENCE  ※MIDDLE OF SENTENCE  ※END OF SENTENCE
- WORD CLASS — 3074
  - ※NOUN  ※VERB  ※ADJECTIVE  ※ADJECTIVE VERB  ※ADNOMINAL NOUN  ※ADVERB
  - ※CONJUNCTION ※INTERJECTION ※AUXILIARY VERB ※PARTICLE
- NUMBER OF APPEARANCES — 3075  [1 ~ ∞]
- NUMBER OF MORAS — 3076  [1 ~ ∞]
- FAMILIARITY — 3077  [1 ~ ∞]
- AGE OF ACQUISITION — 3078  [1 ~ ∞]
- NUMBER OF TEXT VARIATIONS — 3079

[SEARCH] — 305

FIG. 9

OPTION AREA DISPLAY EXAMPLE 2

- TEXT TYPE
  - HIRAGANA · KATAKANA · KANJI · KANJI W/ READINGS
- IN-WORD APPEARANCE LOCATION
  - START OF WORD · MIDDLE OF WORD · END OF WORD
- IN-SENTENCE APPEARANCE LOCATION
  - START OF SENTENCE · MIDDLE OF SENTENCE · END OF SENTENCE
- WORD CLASS
  - NOUN · VERB · ADJECTIVE · ADJECTIVE VERB · ADNOMINAL NOUN · ADVERB
  - CONJUNCTION · INTERJECTION · AUXILIARY VERB · PARTICLE
- NUMBER OF APPEARANCES     5 - 38
- NUMBER OF MORAS     3 - 8
- FAMILIARITY     2.57 - 6.46
- AGE OF ACQUISITION     5 - 21
- NUMBER OF TEXT VARIATIONS     3 - 14

SEARCH

FIG. 10

BOOK SEARCH INTERFACE APPARATUS, BOOK SEARCH METHOD, AND PROGRAM

CROSS-REFERENCE TO RELATED APPLICATIONS

This application is a U.S. 371 Application of International Patent Application No. PCT/JP2019/019834, filed on 20 May 2019, which application claims priority to and the benefit of JP Application No. 2018-111706, filed on 12 Jun. 2018, the disclosures of which are hereby incorporated herein by reference in their entireties.

TECHNICAL FIELD

The present invention relates to techniques for searching for books such as picture books and children's books used for toddlers and children with articulation disorders to practice their pronunciation.

BACKGROUND ART

Patent Literature 1 is an example of a technique for searching for books such as picture books and children's books. Patent Literature 1 discloses a technique for searching for a book having a cover similar to a queried book. According to the technique of Patent Literature 1, a picture book having pictures which appeal to a targeted child can be searched for. The targeted child will therefore actively read a picture book having pictures in which he or she is interested, and will become able to read words and sentences as a result. In other words, the child will become able to pronounce and understand the meanings of words.

CITATION LIST

Patent Literature

Patent Literature 1: Japanese Patent Application Laid-Open No. 2017-129901

SUMMARY OF THE INVENTION

Technical Problem

Some toddlers and children have articulation disorders (called an "articulation disordered-child" hereinafter). "Articulation disorder" is a condition where a person cannot correctly pronounce sounds used in speech (speech sounds). Note that the medical term "articulation" refers to the same concept as the term "articulation" used in the fields of linguistics and phonetics, and the term will therefore encompass both senses in the following. "Articulation" is the process of adjusting the vocal tract for the purpose of pronouncing a variety of speech sounds.

Picture books are sometimes used by articulation disordered-children to practice pronunciation. Specifically, a speech therapist or the like selects a picture book in which elements which the articulation disordered-child cannot pronounce or has difficulty pronouncing appear frequently, and the articulation disordered-child uses the picture book to practice his or her pronunciation. The articulation disordered-child practices pronouncing difficult elements by reading aloud the picture book selected by the speech therapist. For example, if the articulation disordered-child has difficulty pronouncing the sound "shi", the child practices using "Gongitsune (Gon, the Fox)" (by Nankichi Niimi), in which the sound "shi" appears frequently.

However, searching for picture books containing many elements which are difficult to pronounce requires knowledge of both picture books and articulation disorders. Although the technique of Patent Literature 1 can be used to search for picture books having pictures which appeal to an articulation disordered-child, there is a problem in that the technique cannot be used to search for picture books for articulation disordered-children to use for practice.

An object of the present invention is to provide a technique for effectively searching for books such as picture books and children's books used for practice by an articulation disordered-child.

Means for Solving the Problem

To solve the above-described problem, a book search interface apparatus according to an aspect of the present invention is a book search interface apparatus that sets a search condition for searching for a book in which a desired speech sound appears, in accordance with the set search condition. The apparatus includes a search condition setting unit that sets the search condition for a speech sound in accordance with a selection state of kana symbol buttons disposed in a book search screen, the kana symbol buttons corresponding one-to-one to kana symbols indicating respective speech sounds. The book search screen includes at least one of a Japanese syllabary button group in which the kana symbol buttons are classified as vowels or consonants, and an articulation button group in which the kana symbol buttons are classified by articulatory organ and articulation manner.

Effects of the Invention

According to the present invention, books such as picture books and children's books used by an articulation disordered-child to practice pronunciation can be searched for effectively.

BRIEF DESCRIPTION OF DRAWINGS

FIG. 7 is a diagram illustrating linking between button groups.

FIG. 8 is a diagram illustrating multi-level settings for weighting.

FIG. 9 is a diagram illustrating display example 1 of an option area.

FIG. 10 is a diagram illustrating display example 2 of an option area.

DESCRIPTION OF EMBODIMENTS

Embodiments of the present invention will be described hereinafter with reference to the drawings. The following will describe a case where the language is Japanese.

First Embodiment

Figure 1:
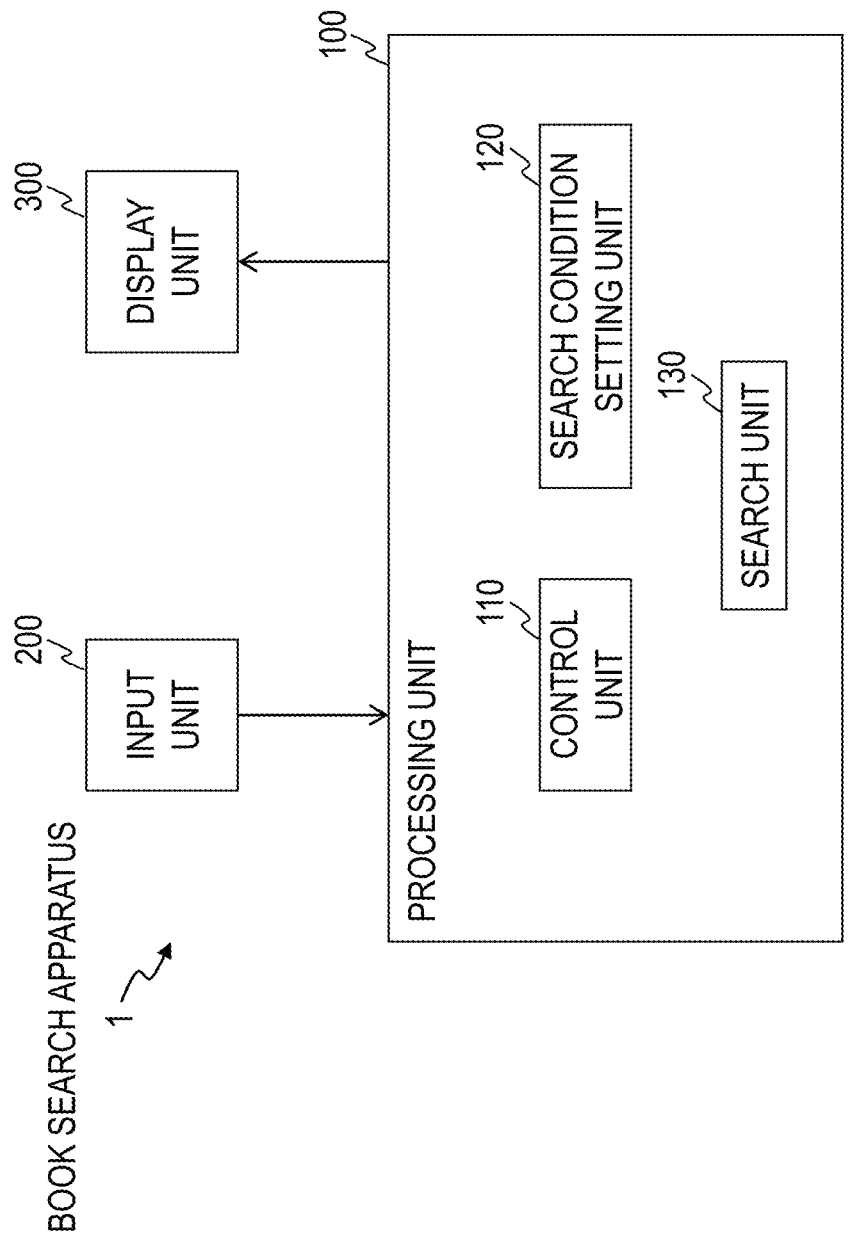
FIG. 1 is a diagram illustrating an example of the functional configuration of a book search apparatus according to an embodiment.

A book search apparatus according to a first embodiment includes, for example, a processing unit 100, an input unit 200, and a display unit 300, as exemplified by a book search apparatus 1 illustrated in FIG. 1. The processing unit 100 includes, for example, a control unit 110, a search condition setting unit 120, and a search unit 130. The book search apparatus 1 according to the first embodiment enables a user to set a search condition using the input unit 200 while viewing a screen area, displayed in the display unit 300, for setting the search condition; and enables a user to understand a search result by searching for a book, such as a picture book or a children's book, in accordance with the search condition set by the user and displaying that search result in the display unit 300.

The processing unit 100 is realized by, for example, a generic or specialized computer including a processor (a hardware processor) such as a CPU (central processing unit), RAM (random-access memory), ROM (read-only memory), a storage device such as a hard disk, and the like executing a predetermined program. This computer may include a single processor and memory, or a plurality of processors and memories. The program may be installed in the computer, or may be recorded in ROM or the like in advance. The processing unit may be partially or completely constituted by electronic circuitry which implements processing functions without using programs, instead of electronic circuitry that implements the functional configuration by having programs loaded, such as a CPU. The electronic circuitry constituting a single apparatus may include a plurality of CPUs. The input unit 200 is a user interface which accepts information input from a user, and the display unit 300 is a user interface which displays information to the user. A mouse, a touch sensor, a trackpad, a keyboard, and the like are examples of the input unit 200. A liquid crystal display, a projection device, and the like are examples of the display unit 300. A desktop personal computer (PC) including a mouse and a liquid crystal display, a laptop PC including a trackpad and a liquid crystal display, a tablet PC including a touch screen (where a touch sensor and a liquid crystal display are provided as a single piece of hardware), a smartphone, and the like are examples of the book search apparatus 1, but the apparatus may be a specialized terminal apparatus.

Operations of the book search apparatus 1 according to the present embodiment will be described next.

Figure 2:
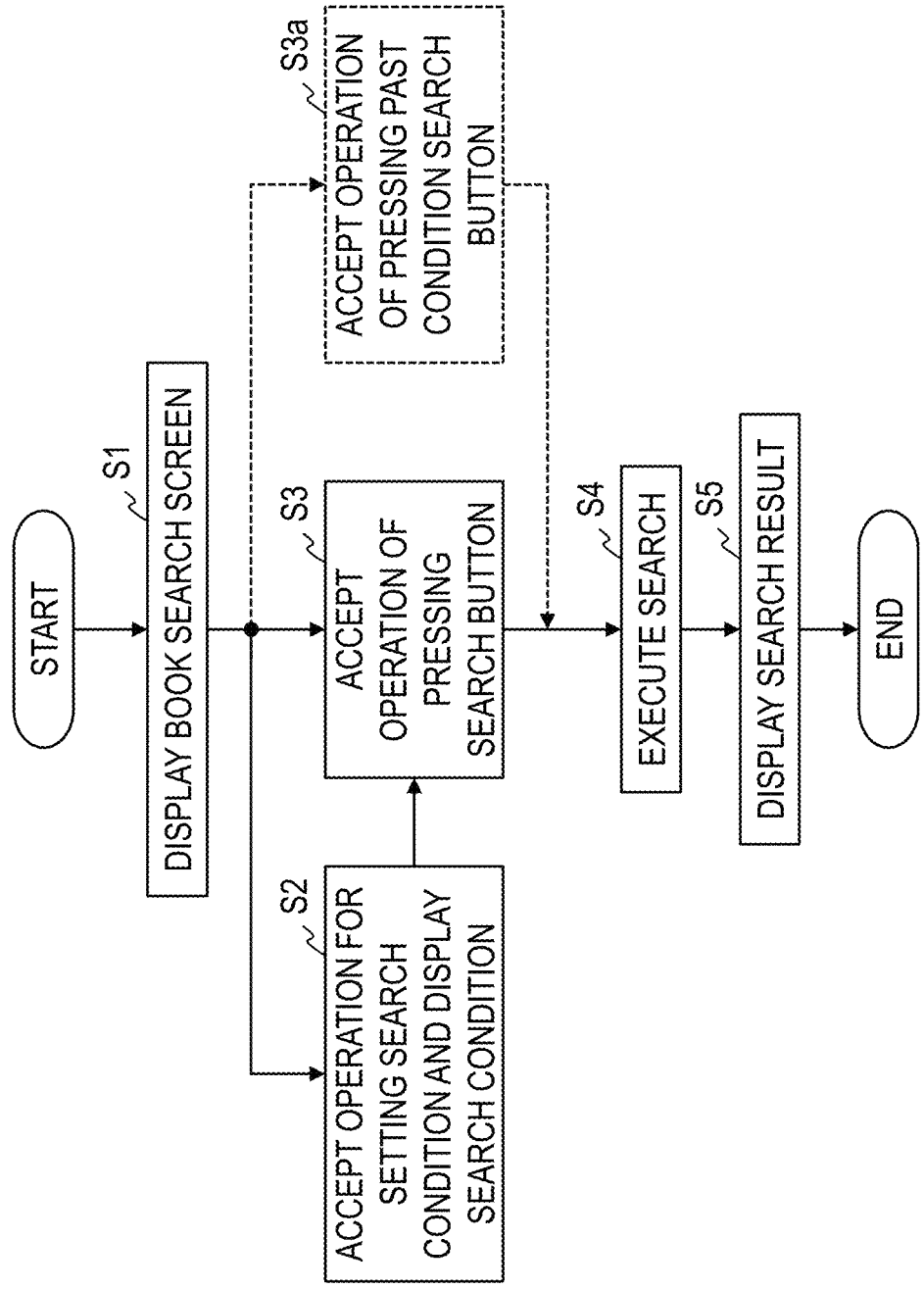
FIG. 2 is a diagram illustrating a processing sequence of a book search method according to an embodiment.

The book search apparatus 1 starts operating in response to a startup operation made by a user. The "startup operation" is, for example, an operation such as pressing a power button, if the book search apparatus 1 is a specialized terminal apparatus; or is an operation such as pressing a program icon or specifying a URL, if the book search apparatus 1 is a PC. In response to the startup operation, the book search apparatus 1 first carries out the operations of step S1, described below, and then carries out operations up to step S5 (see FIG. 2).

<<Book Search Screen Display (Step S1)>>

Figure 3:
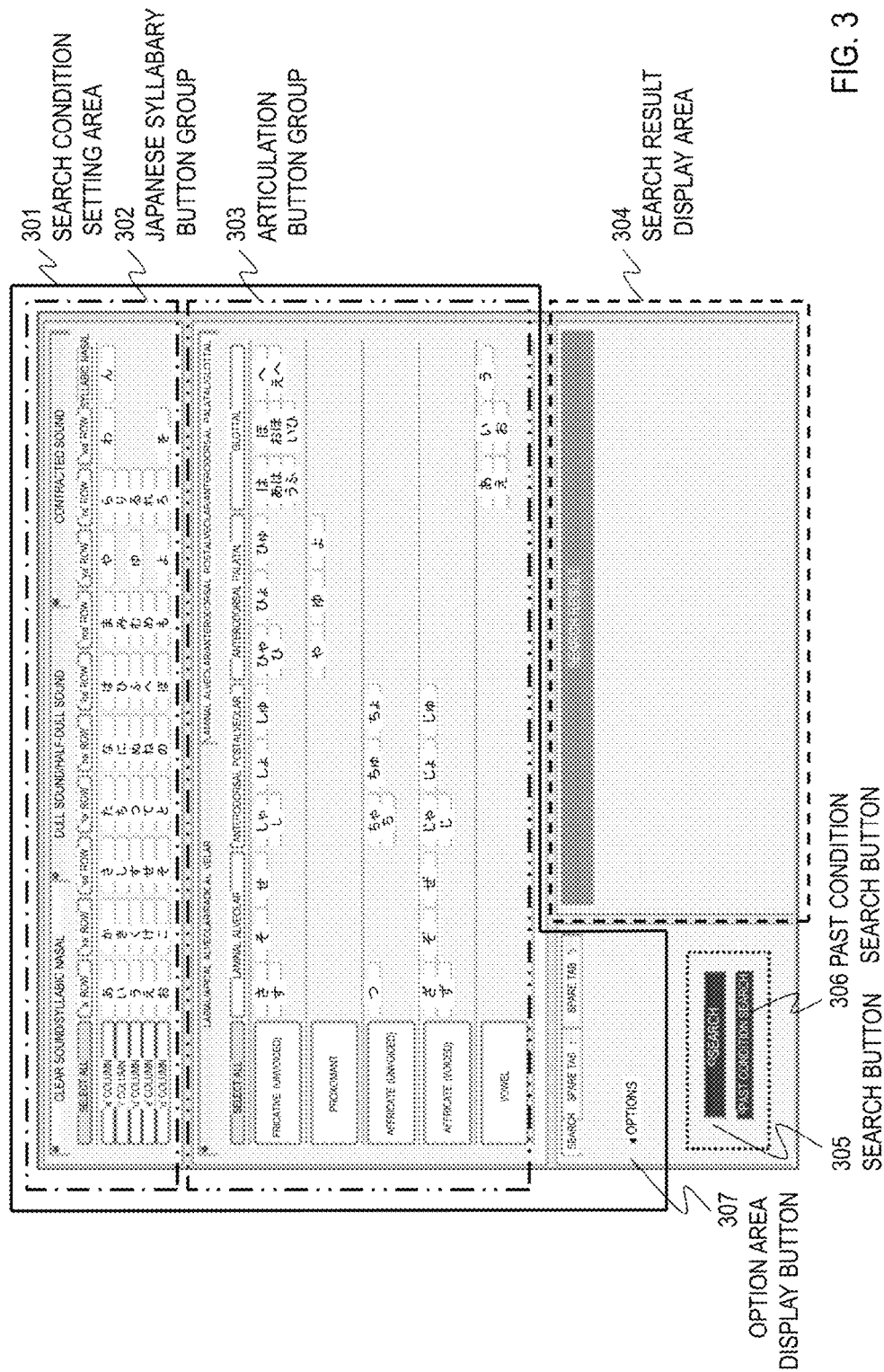
FIG. 3 is a diagram illustrating an example of the display of a book search screen.

When the book search apparatus 1 starts operating, first, the control unit 110 carries out control for displaying a book search screen, an example of which is illustrated in FIG. 3, in the display unit 300, and the display unit 300 displays the book search screen according to that control. The book search screen will be described next.

<Book Search Screen>

As illustrated in FIG. 3, the book search screen includes at least a search condition setting area 301 and a search result display area 304. The search condition setting area 301 is a screen area for setting a search condition, and is the area surrounded by the solid line in FIG. 3, for example. The search result display area 304 is a screen area for presenting a search result, and is the area surrounded by the broken line in FIG. 3, for example.

The book search screen may additionally include a button 305 for instructing a search to be executed using the set search condition, as indicated by the dotted line in FIG. 3 (called a "search button" hereinafter), and may furthermore include a button 306 for instructing a search to be executed using a search condition set in the past (called a "past condition search button" hereinafter). However, by assigning the function of the search button to a right-click of the mouse or the return key of the keyboard being pressed, the search button may be provided outside the display unit 300 of the book search apparatus 1, without being provided in the book search screen.

<Search Condition Setting Area>

As illustrated in FIG. 3, the search condition setting area 301 includes at least one of a Japanese syllabary button group 302 and an articulation button group 303. The search condition setting area 301 may include one or more preset buttons. Furthermore, the search condition setting area may include an option area or a button for displaying an option area.

<Japanese Syllabary Button Group>

The Japanese syllabary button group 302 is a button group in which buttons corresponding one-to-one to kana symbols representing each speech sound (called "kana symbol buttons" hereinafter) are classified by vowels and consonants, and in FIG. 3, is the button group in the area surrounded by the single dot-dash line. The Japanese syllabary button group 302 in FIG. 3 is illustrated again in FIG. 4 for the purpose of the following descriptions.

Figure 4:
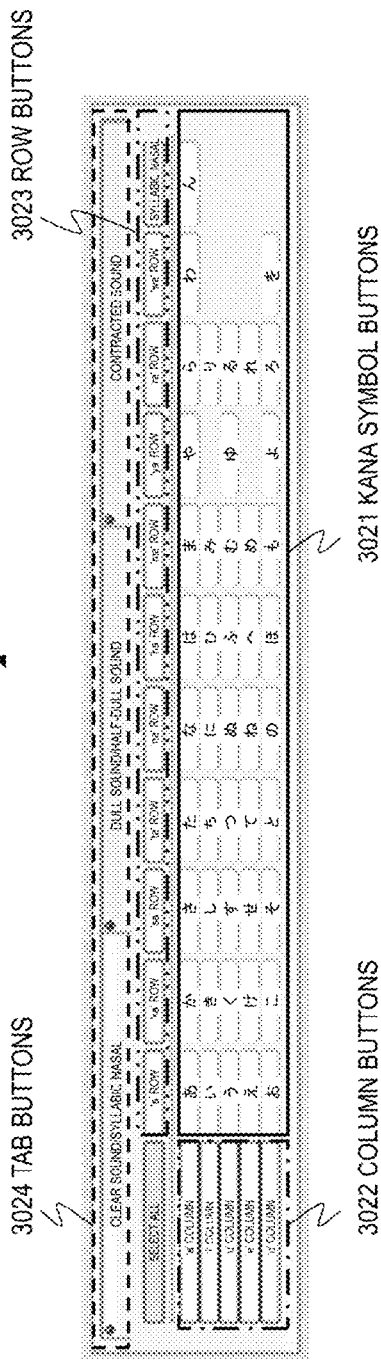
FIG. 4 is a diagram illustrating an example of the display of a Japanese syllabary button group in the book search screen.

The Japanese syllabary corresponds one-to-one to vowel and consonant combinations, and thus the Japanese syllabary button group 302 includes kana symbol buttons 3021, corresponding one-to-one to the kana symbols representing each speech sound, in a table with a plurality of consonants arranged horizontally and a plurality of vowels arranged vertically, as indicated by the area surrounded by the solid line in FIG. 4, for example.

An articulation disordered-child may have difficulty pronouncing all the speech sounds in a given row or a given column. Accordingly, the Japanese syllabary button group 302 may include buttons 3022 corresponding one-to-one to each vowel (called "column buttons" hereinafter) so that all the speech sounds corresponding to each vowel can be selected at once, as indicated by the area surrounded by the single dot-dash line in FIG. 4, for example. Likewise, the Japanese syllabary button group 302 may include buttons 3023 corresponding one-to-one to each consonant (called "row buttons" hereinafter) so that all the speech sounds corresponding to each consonant can be selected at once, as indicated by the area surrounded by the double dot-dash line in FIG. 4, for example.

Although all of the kana symbol buttons may be arranged in a single table in the Japanese syllabary button group 302, the kana symbol buttons may be divided among two or more tables, in consideration of the size and ease of viewing the screen of the display unit 300; for example, buttons 3024 for selecting a table (called "tab buttons" hereinafter) may be provided, as indicated by the area surrounded by the broken line in FIG. 4. For example, a table including kana symbol buttons for clear sounds and syllabic nasals, a table including kana symbol buttons for dull sounds and half-dull sounds, and a table including kana symbol buttons for contracted sounds may be prepared, so that which of the tables to display can be selected by pressing an "clear sound/syllabic nasal" tab button, a "dull sound/half-dull sound" tab button, or a "contracted sound" tab button. Column buttons and row buttons may be provided in each table as well.

Note that the text symbols in the kana symbol buttons may be hiragana symbols, katakana symbols, or Roman letters, or may be a combination of a plurality thereof. However, considering that the purpose is to search for books such as picture books or children's books, it is desirable that the text symbols in the kana symbol buttons include at least hiragana symbols. The same applies to the articulation button group 303, which will be described below.

<Articulation Button Group>

The articulation button group 303 is a button group in which kana symbol buttons corresponding one-to-one to kana symbols representing each speech sound are classified by articulatory organ and articulation manner, and in FIG. 3, is the button group in the area surrounded by the double dot-dash line. The articulation button group 303 in FIG. 3 is illustrated again in FIG. 5 for the purpose of the following descriptions.

"Articulatory organ" refers to the part of the vocal tract used in articulation, such as labial, apical alveolar, radical velar, laminal alveolar, anterodorsal postalveolar, anterodorsal palatal, glottal, or the like. "Articulation manner" refers to the way in which the articulatory organ is used to produce the speech sound, and commonly-known names are given thereto, such as fricative, proxomant, affricate, plosive, nasal, alveolar flap, and the like.

Although some articulation disorders arise due to an inability to auditorily differentiate speech sounds, others arise due to difficulties with pronunciation. Whether each speech sound can be pronounced properly depends on whether the articulatory organ corresponding to that speech sound can be used properly and whether the articulation manner corresponding to that speech sound can be used properly. An articulation disordered-child may have difficulty with pronunciation because the child cannot use a specific articulatory organ, such as the lips or the tip of the tongue, properly, cannot use a specific articulation manner, such as fricatives or affricates, properly, and so on. Accordingly, in the present invention, the articulation button group 303, which classifies the kana symbol buttons corresponding one-to-one to the kana symbols indicating each speech sound by articulatory organ and articulation manner, is prepared, so that the user can easily select speech sounds based on the articulatory organ or articulation manner with which the articulation disordered-child has difficulty.

Figure 5:
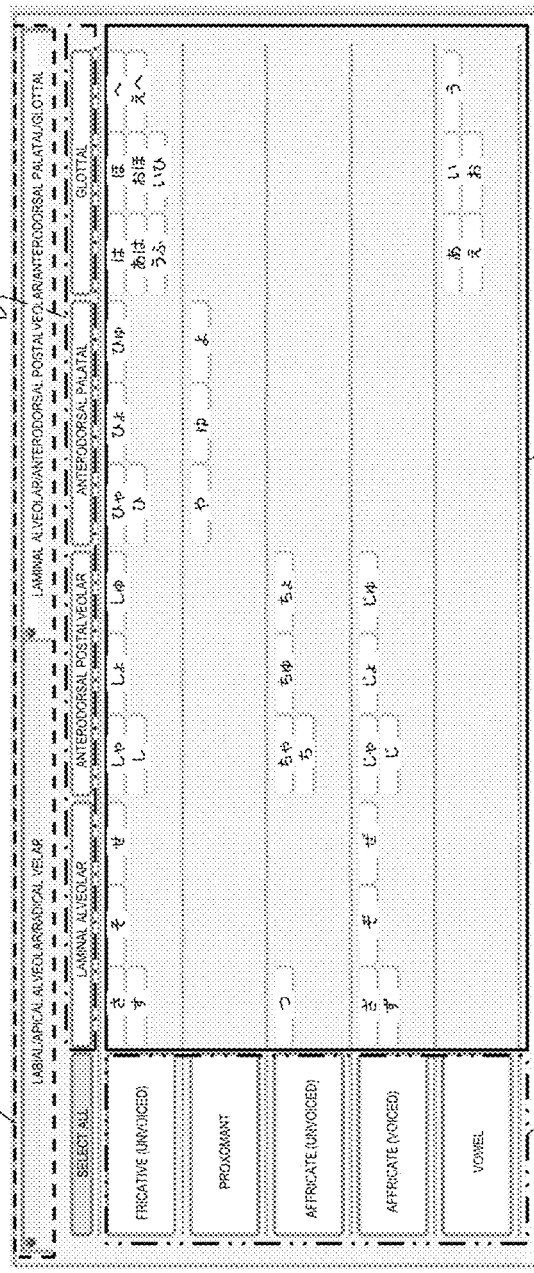
FIG. 5 is a diagram illustrating an example of the display of an articulation button group in the book search screen.

To be more specific, the articulation button group 303 includes kana symbol buttons 3031, corresponding one-to-one to the kana symbols representing each speech sound, in a table with a plurality of articulatory organs arranged horizontally and a plurality of articulation manners arranged vertically, as indicated by the area surrounded by the solid line in FIG. 5, for example. Additionally, the articulation button group 303 may include buttons 3032 corresponding one-to-one to each articulatory organ (called "articulatory organ buttons" hereinafter) so that all the speech sounds corresponding to each articulatory organ can be selected at once, as indicated by the area surrounded by the single dot-dash line in FIG. 5, for example. Likewise, the articulation button group 303 may include buttons 3033 corresponding one-to-one to each articulation manner (called "articulation manner buttons" hereinafter) so that all the speech sounds corresponding to each articulation manner can be selected at once, as indicated by the area surrounded by the double dot-dash line in FIG. 5, for example.

Although all of the kana symbol buttons corresponding to combinations of all the articulatory organs and all the articulation manners may be arranged in a single table in the articulation button group 303, the kana symbol buttons may be divided among two or more tables, in consideration of the size and ease of viewing the screen of the display unit 300; for example, buttons 3034 for selecting a table (called "tab buttons" hereinafter) may be provided, as indicated by the area surrounded by the broken line in FIG. 5. For example, a table including the kana symbol buttons corresponding to some articulatory organs (labial, apical alveolar, and radical velar) and a table including the kana symbol buttons corresponding to the remaining articulatory organs (laminal alveolar, anterodorsal postalveolar, anterodorsal palatal, and glottal) may be prepared, so that which of the tables to display can be selected by pressing a "labial/apical alveolar/radical velar" tab button or a "laminal alveolar/anterodorsal postalveolar/anterodorsal palatal/glottal" tab button. Articulatory organ buttons and articulation manner buttons may be provided in each table as well.

Note that the classification by articulatory organ and articulation manner is primarily for consonants. Thus, in the articulation button group according to the present invention, although "vowel" is, strictly speaking, not an articulation manner, a "vowel" classification is provided on the articulation manner side, and kana symbol buttons for speech sounds including only vowels are classified as the articulatory organ "glottal" and the articulation manner "vowel".

<<Accepting Operation for Setting Search Condition and Displaying Search Condition (Step S2)>>

In the book search apparatus 1, next, the control unit 110 carries out control so as to accept user operations, in the input unit 200, of pressing the buttons within the search condition setting area of the book search screen displayed in the display unit 300; instructs the search condition setting unit 120 to set a search condition corresponding to the pressing operation accepted by the input unit 200; and causing the display unit 300 to display a book search screen which has been changed so as to correspond to the pressing operation which has been accepted and the search condition set by the search condition setting unit 120 in response to the accepted pressing operation. The search condition setting unit 120 then sets the search condition in accordance with the instruction from the control unit 110, and the display unit 300 displays the changed book search screen in accordance with the instruction from the control unit 110. The setting of the search condition and the display of the book search screen resulting therefrom will be described below.

Note that in the following, the control unit 110 carrying out control for accepting the operation, in the input unit 200, of pressing a button in the book search screen displayed in the display unit 300 will be called "a button being pressed" for convenience. Additionally, the control unit 110 instructing the search condition setting unit 120 to set a search condition, and the search condition setting unit 120 setting the search condition in accordance with the instruction from the control unit 110 will be called "setting a search condition" for convenience. Furthermore, the control unit 110 controlling the display unit 300 to display the book search screen changed so as to correspond to the pressing operation accepted by the input unit 200 and the search condition set by the search condition setting unit 120 in response to the accepted pressing operation, and the display unit 300 displaying the changed book search screen in response to the instruction from the control unit 110 will be called "displaying" for convenience.

<Single Sound Designation, Multiple Designation, and Batch Designation>

When a given kana symbol button has been pressed, a search condition which includes the speech sound of that kana symbol as a sound to be searched for (called a "search target sound" hereinafter) is set, and a display is provided on the kana symbol button so that the search condition, which includes the speech sound of that kana symbol as the search target sound, having been set can be visually confirmed. Additionally, when a kana symbol button for a speech sound already included in the search condition as a search target sound has been pressed, a search condition which does not include the speech sound of that kana symbol as a search target sound is set, and a display is provided on the kana symbol button so that the search condition, which does not include the speech sound of that kana symbol as the search target sound, having been set can be visually confirmed. For example, to make a speech sound of a given kana symbol being included as a search target sound in the search condition visually recognizable, a background of the text symbol in the kana symbol button for that speech sound may be set to white, and to make a speech sound of a given kana symbol not being included as a search target sound in the search condition visually recognizable, a background of the text symbol in the kana symbol button for that speech sound may be set to a color aside from white.

When a column button has been pressed in a table of the Japanese syllabary button group, a search condition which includes all of the speech sounds corresponding to the vowels in that column of the table as search target sounds is set, and a display is provided on the kana symbol buttons so that the search condition, which includes those speech sounds as the search target sounds, having been set can be visually confirmed. In this case, a display is provided in the column button so that the speech sounds of that column having been included in the search condition as search target sounds as a result of the column button being pressed can be visually recognized. For example, a background of the text symbol in the column button is set to a color aside from white. Additionally, when a column button has been pressed in a state where the speech sounds of that column have already been included as the search target sounds in the search condition due to the column button being pressed, a search condition which does not include all of the speech sounds corresponding to the vowel of that column as search target sounds is set, and a display is provided on the kana symbol button so that the search condition, which does not include those speech sounds as the search target sounds, having been set can be visually confirmed. In this case, a display is provided in the column button so that the speech sounds of that column having not been included in the search condition as search target sounds as a result of the column button being pressed can be visually recognized.

When the row button has been pressed in a table in the Japanese syllabary button group, when an articulatory organ button has been pressed in a table in the articulation button group, and when an articulation manner button has been pressed in a table in the articulation button group, the various units of the book search apparatus 1 operate in the same manner as when a column button has been pressed in a table in the Japanese syllabary button group.

Figure 6:
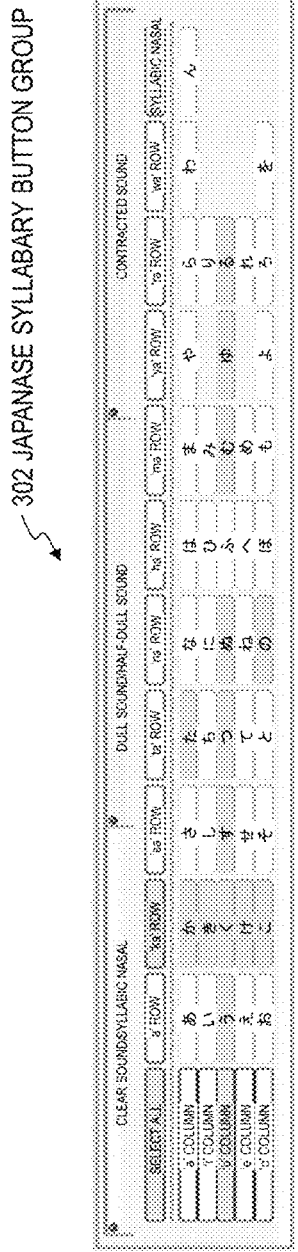
FIG. 6 is a diagram illustrating single sound designation, multiple designation, and batch designation.

FIG. 6 is an example of the display of the Japanese syllabary button group in the book search screen when the kana symbol button for "fu" has been pressed after the kana symbol button for "ta", the kana symbol button for "no", the column button for the "'u' column", and the row button for the "'ka' row" have been pressed. In this case, a search condition is set which includes "ta", "no", all of the sounds in the "ka" row, i.e., "ka", "ki", "ku", "ke", and "ko", and all of the sounds in the "u" column aside from "fu", i.e., "u", "su", "tsu", "nu", "mu", "yu", and "ru"; the backgrounds of the kana symbol buttons for these speech sounds, and the text symbols for the column button "'u' column" and the row button "'ka' row", are displayed in a color aside from white.

<Function for Linking Between Button Groups>

When the search condition setting area of the book search screen includes both the Japanese syllabary button group and the articulation button group, and a given kana symbol button has been pressed in one of the button groups, it is useful to display the setting of the search condition including the speech sound of that kana symbol as a search target sound in a visually-recognizable manner not only in the kana symbol button in question, but also in the kana symbol button for that kana symbol included in the other button group as well. In other words, when a given kana symbol button has been pressed, it is useful to display the setting of the search condition including the speech sound of that kana symbol as a search target sound in the kana symbol button, in both the Japanese syllabary button group and the articulation button group.

When the search condition setting area of the book search screen includes both the Japanese syllabary button group and the articulation button group, and a row button has been pressed in a table in the Japanese syllabary button group, a column button has been pressed in a table in the Japanese syllabary button group, an articulatory organ button has been pressed in a table in the articulation button group, or an articulation manner button has been pressed in a table in the articulation button group, it is useful to display the setting of the search condition including the speech sounds of those kana symbols as search target sounds in a visually-recognizable manner for all of the speech sounds corresponding to the pressed buttons, in the kana symbol buttons for the kana symbols in the other button group as well.

Figure 7:
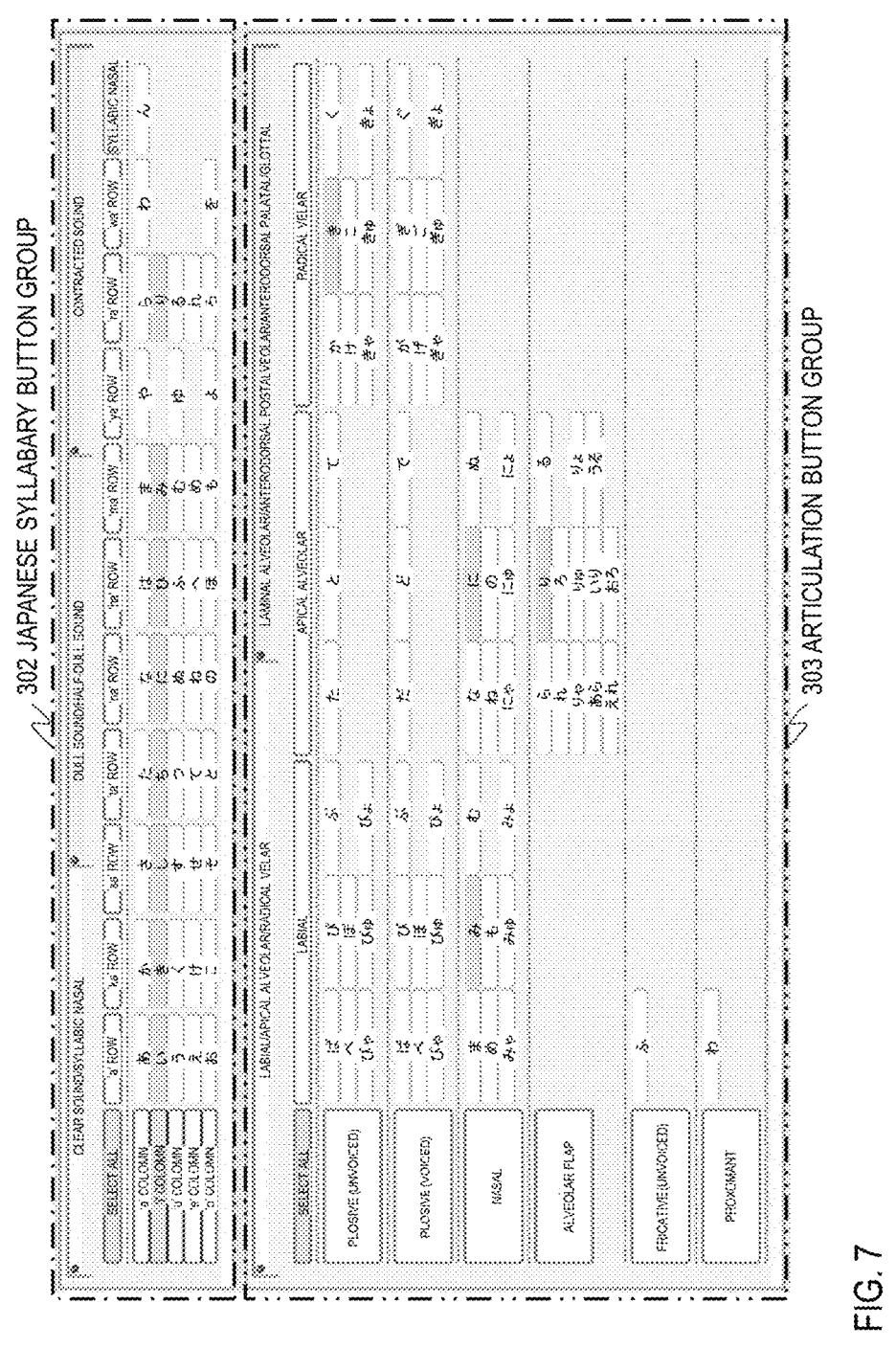

FIG. 7 is an example of the display of the Japanese syllabary button group and the articulation button group in the book search screen when the column button "'i' column" has been pressed in the Japanese syllabary button group. In this case, a search condition including all of the sounds in the pressed column button "'i' column", i.e., "i", "ki", "shi", "chi", "ni", "hi", "mi", and "ri", is set, and the backgrounds of the text symbols are set to a color aside from white in the kana symbol buttons of these speech sounds in the Japanese syllabary button group, the column button "'i' column" in the Japanese syllabary button group, and "ki", "ni", "mi", and "ri" included in the "labial/apical alveolar/radical velar" table currently displayed out of the articulation button group. Although not illustrated, if the "laminal alveolar/anterodorsal postalveolar/anterodorsal palatal/glottal" table of the articulation button group is displayed, the backgrounds of the text symbols are set to a color aside from white for "i", "shi", "chi", and "hi" in the articulation button group.

Only some specialists can be expected to remember which articulatory organ and which articulation manner is used to produce each speech sound, and most people will likely need to consult a textbook or the like to check these items. However, a table which employs a Japanese syllabary button group corresponds to the Japanese syllabary table itself, which is widely known, and can therefore be used intuitively by anyone. Thus, according to the present invention, providing the function for linking between button groups makes it possible to cross-reference a speech sound which is difficult for an articulation disordered-child between a position based on the vowel/consonant combination and a position based on an articulatory organ/articulation manner.

<Multi-Level Settings for Weighting>

The foregoing has described two ways in which the user sets the search condition for the speech sound of each kana symbol: setting the search condition that includes that speech sound as the search target sound, and setting the search condition that does not include the speech sound as the search target sound. However, the configuration may be such that when, for the speech sound of each kana symbol, the search condition is set including that speech sound as the search target sound, the search condition can be set including whether to increase or reduce a weighting value used when searching for that speech sound. This may be carried out as follows.

When a given kana symbol button has been pressed, a search condition including the speech sound of that kana symbol with a low weighting value as the search target sound is set, and that search condition being set is displayed in the kana symbol button in a visually-recognizable manner. For example, the background of the text symbol in the kana symbol button for that speech sound is set to a light color.

Additionally, when a kana symbol button of a speech sound already included in the search condition as a search target sound with a low weighting value has been pressed, a search condition including the speech sound of that kana symbol with a high weighting value as the search target sound is set, and that search condition being set is displayed in the kana symbol button in a visually-recognizable manner. For example, the background of the text symbol in the kana symbol button for that speech sound is set to a dark color.

Additionally, when a kana symbol button of a speech sound already included in the search condition as a search target sound with a high weighting value has been pressed, a search condition not including the speech sound of that kana symbol as a search target sound is set, and that search condition being set is displayed in the kana symbol button in a visually-recognizable manner. For example, the background of the text symbol in the kana symbol button for that speech sound is set to white.

Note that similar operations may be carried out when the row button is pressed in a table in the Japanese syllabary button group, when the column button is pressed in a table in the Japanese syllabary button group, when an articulatory organ button is pressed in a table in the articulation button group, and when an articulation manner button is pressed in a table in the articulation button group.

Figure 8:
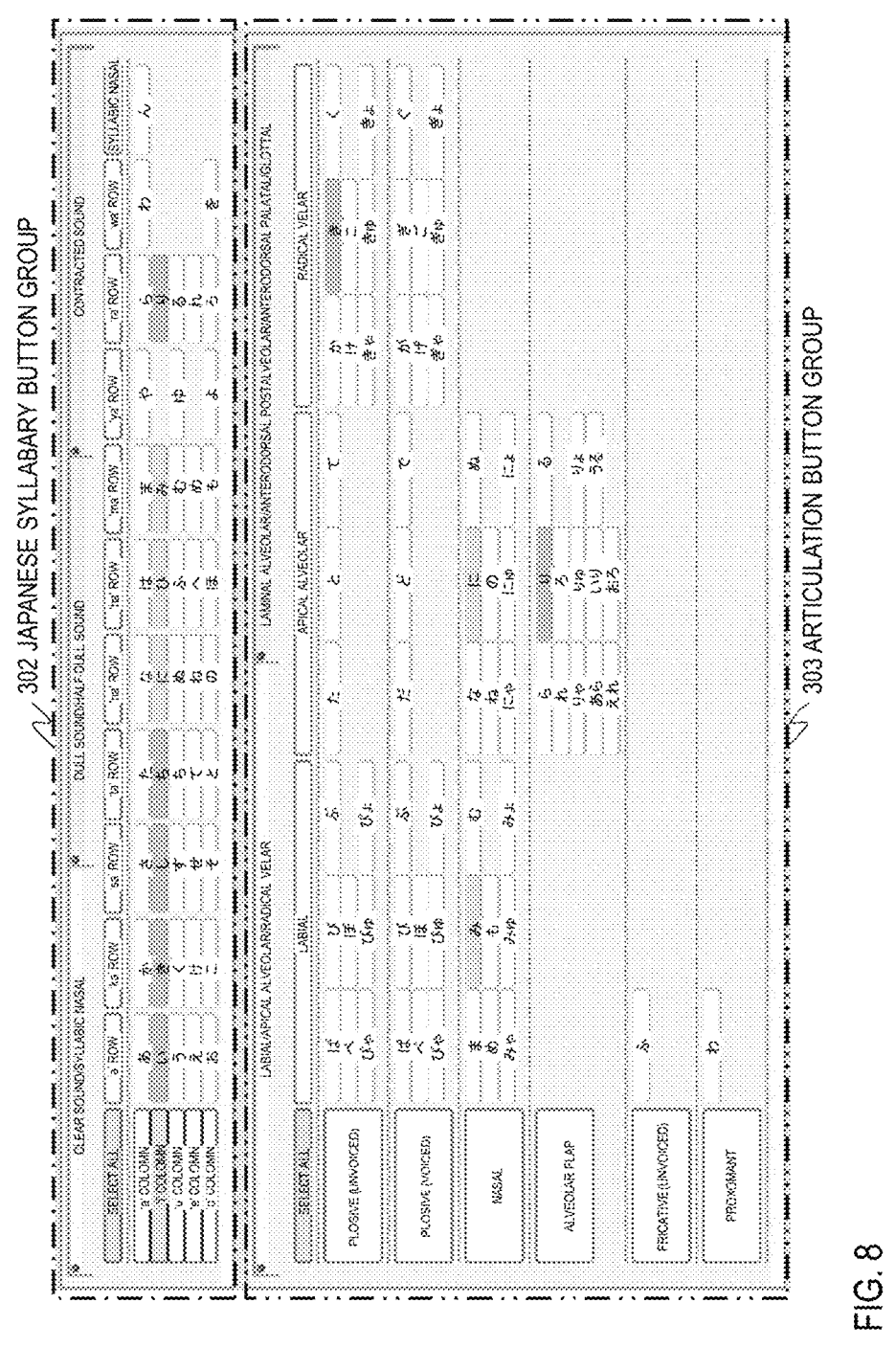

In reality, there are some articulation disordered-children who have difficultly pronouncing sounds in the "i" column, and have particular difficulty pronouncing "i", "ki", "shi", "chi", and "ri". If the user is to search for books such as picture books and children's books for such an articulation disordered-child to use for pronunciation practice, it is useful to search for books such as picture books and children's books which include many speech sounds in the "i" column, and which include many instances of "i", "ki", "shi", "chi", and "ri" in particular. In such a case, the user may set the search condition to include all of the speech sounds in the "i" column as search target sounds, with a higher weighting given to "i", "ki", "shi", "chi", and "ri" as search target sounds, by first pressing the row button "'i' column" and then pressing the "i", "ki", "shi", "chi", and "ri" buttons. In this case, the search condition is set to include the speech sounds in the "i" column aside from "i", "ki", "shi", "chi", and "ri" (i.e., "ni", "hi", and "mi") as search target sounds with a low weighting value. FIG. 8 is an example of a display of the Japanese syllabary button group and the articulation button group in the book search screen in this case, where for "i", "ki", "shi", "chi", and "ri" in the "i" column, the backgrounds of the text symbols are set to a dark color so that the search condition having been set to include those speech sounds as search target sounds with a high weighting value can be visually recognized, and for "ni", "hi", and "mi", which are the other speech sounds in the "i" column, the backgrounds of the text symbols are set to a light color so that the search condition having been set to include those speech sounds as search target sounds with a low weighting value can be visually recognized.

Note that the configuration may be such that the weighting value can be set to three levels, i.e., high, medium, and low, or to four or more levels, when searching for each speech sound. For example, if the weighting value can be set to three levels, i.e., high, medium, and low, during searches, operations may be carried out so that each time a button is pressed, the search condition is set to include speech sounds with low weighting values as search target sounds, the search condition is set to include speech sounds with medium weighting values as search target sounds, the search condition is set to include speech sounds with high weighting values as search target sounds, the search condition is set not to include as the search target sounds, the search condition is set to include speech sounds with low weighting values as search target sounds (i.e. return to the initial search condition), and so on. In this case, a medium color which is a color having a darkness between the aforementioned light color and dark color may be used, and each time a button is pressed, the background of the text symbol of that button may be set as follows: the light color, indicating that a search condition including a low-level weighting value as the search target sound has been set; the medium color, indicating that a search condition including a medium-level weighting value as the search target sound has been set; the dark color, indicating that a search condition including a high-level weighting value has the search target sound has been set; white, indicating that a search condition not including as the search target sound has been set; and so on.

<Presets>

The preset button is a button corresponding one-to-one to a predetermined search condition. The preset button may, for example, be disposed in an area, within the search condition setting area 301 surrounded by the solid line in FIG. 3, that is different from the area including the Japanese syllabary button group 302 (the area surrounded by the single dot-dash line) and the area including the articulation button group 303 (the area surrounded by the double dot-dash line).

The predetermined search condition is a search condition including a predetermined plurality of speech sounds as sounds to be searched for, and may be a search condition that also includes the weighting values used when searching for those speech sounds. The predetermined search condition may be a single condition or plurality of conditions, and for example, the search conditions mentioned in each of the examples described with reference to FIG. 6 to FIG. 8 may be used. The book search apparatus 1 stores each search condition, which includes a plurality of speech sounds as sounds to be searched for, in association with preset buttons in a storage unit (not shown); when a preset button is pressed, the search condition corresponding to the pressed preset button is set, and the book search screen corresponding to the set search condition is displayed.

For example, the book search screen may include two preset buttons, namely a preset button 1 corresponding to the search condition illustrated in FIG. 6 and a preset button 2 corresponding to the search condition illustrated in FIG. 8. In this case, the search condition described above with reference to FIG. 6 may be set, and the background colors of the text symbols may be set as illustrated in FIG. 6 as a display corresponding to the set search condition, when the preset button 1 is pressed, and the search condition described above with reference to FIG. 8 may be set, and the background colors of the text symbols may be set as illustrated in FIG. 8 as a display corresponding to the set search condition, when the preset button 2 is pressed.

<<Accepting Operation of Pressing Search Button (Step S3)>>

In the book search apparatus 1, in parallel with step S2, the control unit 110 carries out control for accepting a pressing operation in the input unit 200, made by a user on the search button; and in response to the input unit 200 accepting the pressing operation on the search button, the control unit 110 inputs the search conditions, already set at that point in time by the search condition setting unit 120, into the search unit 130, and instructs the search unit 130 to execute a search using the input search conditions.

Additionally, if the book search apparatus 1 includes the past condition search button, the control unit 110, in response to the input unit 200 accepting an operation of the search button being pressed, sets a search condition n places previous (where n is an integer greater than or equal to 1), stored in the storage unit (not shown) within the search condition setting unit 120, as an n+1th previous search condition, and stores the search condition already set in the search condition setting unit 120 at that point in time in the storage unit as a search condition from one place previous.

<<Accepting Operation of Pressing Past Condition Search Button (Step S3a)>>

If the book search apparatus 1 also includes the past condition search button, in parallel with the aforementioned step S2 and step S3, the control unit 110 carries out control for accepting a pressing operation in the input unit 200, made by a user on the past condition search button; and in response to the input unit 200 accepting the pressing operation on the past condition search button, the control unit 110 inputs a past search condition, stored in the storage unit (not shown) in the search condition setting unit 120, into the search unit 130, and instructs the search unit 130 to execute a search using the input search conditions.

For example, if the book search apparatus 1 includes only one button as the past condition search button, each time a pressing operation on the past condition search button is accepted, the search condition one place previous may be input to the search unit 130, the search condition two places previous may be input to the search unit 130, and so on, and the search unit 130 may be instructed to execute the search according to the input search condition. In other words, the search unit 130 may be instructed to execute a search using the past search condition corresponding to the number of times an operation for pressing the past condition search button has been made.

Additionally, if, for example, the book search apparatus 1 includes buttons for searching using the search conditions from one place previous to N places previous (where N is an integer greater than or equal to 2) as the past condition search buttons (N past condition search buttons), a search condition the number of places in the past corresponding to the past condition search button for which the pressing operation has been accepted may be input to the search unit 130, and the search unit 130 may be instructed to execute a search using the input search condition. In other words, the search unit 130 may be instructed to execute a search using the past search condition corresponding to the past condition search button which has been pressed.

Additionally, if, for example, the book search apparatus 1 includes two buttons, namely an "undo" button and a "redo" button, as the past condition search button, and if a pressing operation on the undo button has been accepted, the search condition one place previous to the search condition effective immediately before the pressing operation may be input to the search unit 130, whereas if a pressing operation on the redo button has been accepted, the search condition one place after the search condition effective immediately before the pressing operation may be input to the search unit 130, and the search unit 130 may then be instructed to execute a search using the input search condition. In other words, the search unit 130 may be instructed to execute a search using the past search condition corresponding to the past condition search button which has been pressed.

<<Search Execution (Step S4)>>

When the control unit 110 has issued an instruction to execute a search, the search unit 130 executes a search for a book using the input search condition, and sends the search result to the control unit 110.

The search unit 130 may use a known search technique to obtain information of a book corresponding to the input search condition as a search result. For example, the search unit 130 may use an information presenting apparatus described in Japanese Patent Application Publication No. 2014-235723 or Japanese Patent Application Publication No. 2016-148927. The information of a book obtained as the search result may be bibliographical information, the cover, a numerical value indicating a degree of conformity to the search condition, and so on of a book such as a picture book or a children's book, for example.

Note that when the input search condition is the same as a past search condition, a past search result stored in a storage unit (not shown) within the search unit 130 may be read out and sent to the control unit 110, instead of executing a search for a book using the input search condition.

<<Search Result Display (Step S5)>>

In response to the search result being input from the search unit 130, the control unit 110 causes the display unit 300 to display a book search screen which has been changed so as to include the information of the book, input from the search unit 130, in the search result display area of the book search screen. The display unit 300 then displays the changed book search screen in accordance with the instruction from the control unit 110. In other words, bibliographical information, the cover, a numerical value indicating a degree of conformity to the search condition, or the like of a book such as a picture book or a children's book is displayed in the display unit 300 as the information of the book corresponding to the set search condition.

Second Embodiment

In the first embodiment, the search conditions are whether or not a given speech sound is included as a search target sound and the weighting value of the speech sound included as a search target sound, but the manner in which a speech sound included as a search target sound appears in a book such as a picture book or a children's book may also be included in the search conditions. The second embodiment will describe such a configuration.

Like the book search apparatus according to the first embodiment, the book search apparatus according to the second embodiment includes, for example, the processing unit 100, the input unit 200, and the display unit 300, as exemplified by the book search apparatus 1 illustrated in FIG. 1. The processing unit 100 includes, for example, the control unit 110, the search condition setting unit 120, and the search unit 130. Like the book search apparatus 1 according to the first embodiment, the book search apparatus 1 according to the second embodiment enables a user to set a search condition using the input unit 200 while viewing a screen area, displayed in the display unit 300, for setting the search condition; and enables a user to understand a search result by searching for a book in accordance with the search condition set by the user and displaying that search result in a screen area used for the display unit 300 to present the search result. The book search apparatus 1 according to the second embodiment differs from the book search apparatus 1 according to the first embodiment in that the manner in which the speech sound set as the search target sound appears in the book can be included in the search conditions in addition to the setting of the search target sound using the buttons described in the first embodiment (the buttons included in the Japanese syllabary button group, the buttons included in the articulation button group, and the preset buttons), and thus the following will described only the differences from the first embodiment.

<Search Condition Setting Area>

The search condition setting area of the book search screen includes an option area or a button for displaying an option area (called an "option area display button" hereinafter), in addition to at least one of the Japanese syllabary button group and the articulation button group. The option area or the option area display button is disposed in an area, within the search condition setting area 301 surrounded by the solid line in FIG. 3, that is different from the area including the Japanese syllabary button group 302 (the area surrounded by the single dot-dash line) and the area including the articulation button group 303 (the area surrounded by the double dot-dash line). The option area display button is a button 307, indicated by "options", in a lower-left part of the search condition setting area 301 surrounded by the solid line in FIG. 3, for example. When the option area display button is disposed within the search condition setting area, the option area is displayed when the option area display button is pressed.

<Designating Options>

The option area includes at least one of buttons (called "option buttons" hereinafter) and slide bars (called "option bars" hereinafter) for designating the manner in which the speech sound designated as a search target sound using the buttons described in the first embodiment (the buttons included in the Japanese syllabary button group, the buttons included in the articulation button group, and the preset buttons) appears in the book. FIG. 9 is an example of the option area. As illustrated in FIG. 9, the option area includes at least one of the following, for example: a plurality of text type buttons 3071 classified into a text type button group; a plurality of in-word appearance location buttons 3072 classified into a button group indicating appearance locations within words; a plurality of in-sentence appearance location buttons 3073 classified into a button group indicating appearance locations within a sentence; a plurality of word class buttons 3074 classified into a word class button group; an appearance number option bar 3075; a mora number option bar 3076; a familiarity option bar 3077; an acquisition age option bar 3078; and a text variation number option bar 3079.

[Text Type Button Group]

The text type button group (also called a "text type setting field" hereinafter) is a button group including buttons for designating the type of text with which the speech sounds set as search target sounds appear within the book, and includes, for example, buttons (text type buttons) corresponding one-to-one to hiragana, katakana, kanji, and kanji with readings, as illustrated in FIG. 9.

For example, in a default state, all of the types of text may be in a selected state; then, when a given text type button is pressed, the search condition may be set so as not to include the speech sounds corresponding to that type of text as search target sounds, and that search condition being set may be displayed in the text type buttons in a visually-recognizable manner. Conversely, in a default state, all of the types of text may be in an unselected state; then, when a given text type button is pressed, the search condition may be set so as to include the speech sounds corresponding to that type of text as search target sounds, and that search condition being set may be displayed in the text type buttons in a visually-recognizable manner.

Articulation disordered-children who practice their pronunciation by reading books such as picture books and children's books aloud are comparatively older children, and are often capable of silently reading the various types of text in the sentences of a book and understanding the content. However, practicing pronunciation by reading sentences in a book aloud requires significant care for the pronunciation itself, and there are thus situations where a child can read text silently but cannot read the same text aloud. Accordingly, providing this button group makes it possible for the user to search for books such as picture books and children's books having set an appropriate difficulty level, such as a low difficulty level for the beginning of the practice, so as to search for books such as picture books and children's books written in text without the relatively difficult kanji; a high difficulty level, at the stage where the child's practice has made progress; and so on.

[In-Word Appearance Location Button Group]

The in-word appearance location button group (also called an "in-word appearance location setting field" hereinafter) is a button group including buttons for designating where in words within a book the speech sounds set as search target sounds appear, and includes, for example, buttons (in-word appearance location buttons) corresponding one-to-one to the start of the word, the middle of the word, and the end of the word, as illustrated in FIG. 9. In a default state, the search condition settings and the display which makes the set search condition visually-recognizable are the same as for the text type button group.

Even if an articulation disordered-child has difficulty pronouncing some sounds, he or she will pronounce sounds more carefully the closer they are to the first half of the word, and therefore may be able to pronounce the sound successfully. To put it differently, an articulation disordered-child will have difficulty improving his or her pronunciation of sounds which appear at the end of a word. Accordingly, providing this button group makes it possible for the user to search for books such as picture books and children's books that allow for more highly effective practice, by making it possible to designate where in a word the difficult speech sound is located.

[In-Sentence Appearance Location Button Group]

The in-sentence appearance location button group (also called an "in-sentence appearance location setting field" hereinafter) is a button group including buttons for designating where in a sentence within a book the speech sounds set as search target sounds appear, and includes, for example, buttons (in-sentence appearance location buttons) corresponding one-to-one to the start of the sentence, the middle of the sentence, and the end of the sentence, as illustrated in FIG. 9. In a default state, the search condition settings and the display which makes the set search condition visually-recognizable are the same as for the text type button group.

The appearance location within a sentence is the similar to the appearance location within a word, in that even if an articulation disordered-child has difficulty pronouncing a sound, he or she will pronounce sounds more carefully the closer they are to the first half of the sentence, and therefore may be able to pronounce the sound successfully. To put it differently, an articulation disordered-child will have difficulty improving his or her pronunciation of sounds which appear at the end of a sentence. Accordingly, providing this button group makes it possible for the user to search for books such as picture books and children's books that allow for more highly effective practice, by making it possible to designate where in a sentence the difficult speech sound is located.

[Word Class Button Group]

The word class button group (also called a "word class setting field" hereinafter) is a button group including buttons for designating in which word classes in a book the speech sound set as the search target sound appears, and includes, for example, buttons (word class buttons) corresponding one-to-one to nouns, verbs, adjectives, adjective verbs, adnominal nouns, adverbs, conjunctions, interjections, auxiliary verbs, and particles, as illustrated in FIG. 9. In a default state, the search condition settings and the display which makes the set search condition visually-recognizable are the same as for the text type button group.

Depending on whether or not a word is an independent word, an essential constituent element, such as the subject or the predicate, within a sentence, and the like, an articulation disordered-child may or may not pronounce the word with care, or in other words, an articulation disordered-child may or may not be able to pronounce the word well. Accordingly, providing this button group is expected to make it possible for the user to search for books such as picture books and children's books that allow for more highly effective practice.

[Appearance Number Option Bar]

The appearance number option bar (also called an "appearance number setting field" hereinafter) is an element for designating the number of times a speech sound set as a search target sound appears within a book, and is, for example, a slider bar through which a minimum value and a maximum value can be designated, as illustrated in FIG. 9 and FIG. 10.

For example, in a default state, all of the appearance numbers may be in a selected state; then, as shown in FIG. 10, for example, when a minimum value and a maximum value have been set, a search condition may be set in which the number of times the speech sound set as the search target sound appears within a book is within a range defined by the set minimum value and the set maximum value, and the set appearance number may be displayed in a visually-recognizable manner. To be more specific, for example, as illustrated in FIG. 9, in a default state, all of the appearance numbers (from 1 to 00) may be in a selected state; then, as shown in FIG. 10, when a minimum value of 5 and a maximum value of 38 have been set, a search condition may be set in which the number of times the speech sound set as the search target sound appears within a book is greater than or equal to 5 and less than or equal to 38, and that search condition having been set may be displayed in a visually-recognizable manner.

If the number of times a speech sound set as a search target sound appears in a book used for practice is low, that speech sound will only be pronounced a small number of times, and may therefore be ineffective in terms of practice. On the other hand, if the number of times a speech sound set as a search target sound appears in a book used for practice is too high, the frequent appearance of the same word and the like may result in the articulation disordered-child growing tired of practicing, which can hamper the effectiveness of the practice. Accordingly, providing this option bar is expected to make it possible for the user to search for books such as picture books and children's books that allow for more highly effective practice.

[Mora Number Option Bar]

The mora number option bar (also called a "mora number setting field" hereinafter) is an element for designating the number of moras in words within a book including a speech sound set as a search target sound appears, and is, for example, a slider bar through which a minimum value and a maximum value can be designated, as illustrated in FIG. 9 and FIG. 10.

Generally speaking, words with a higher number of moras are more difficult to pronounce. Accordingly, the difficulty of practice can be set lower by setting the number of moras within a smaller range of values, and the difficulty of practice can be set higher by setting the number of moras within a greater range of values. Accordingly, providing this option bar makes it possible to easily set the difficulty of the practice. In a default state, the search condition settings and the display which makes the set search condition visually-recognizable are the same as for the appearance number option bar.

[Familiarity Option Bar]

The familiarity option bar (also called a "familiarity setting field" hereinafter) is an element for designating the familiarity of words within a book including a speech sound set as a search target sound appears, and is, for example, a slider bar through which a minimum value and a maximum value can be designated, as illustrated in FIG. 9 and FIG. 10.

A word with a high familiarity is a word which is used often on a daily basis. In other words, it is thought that a sound which is difficult for an articulation disordered-child to pronounce may be easier to pronounce the more it appears in words with a high familiarity. Accordingly, the difficulty of practice can be set lower by setting the familiarity within a smaller range of values, and the difficulty of practice can be set higher by setting the familiarity within a greater range of values. Accordingly, providing this option bar makes it possible to easily set the difficulty of the practice. In a default state, the search condition settings and the display which makes the set search condition visually-recognizable are the same as for the appearance number option bar.

[Acquisition Age Option Bar]

The acquisition age option bar (also called an "acquisition age setting field" hereinafter) is an element for designating the age of acquisition of words within a book including a speech sound set as a search target sound appears, and is, for example, a slider bar through which a minimum value and a maximum value for the age of acquisition in months can be designated, as illustrated in FIG. 9 and FIG. 10. The age of acquisition in years, for example, may be used instead of the age of acquisition in months.

A word for which the age of acquisition is a low value is a word that, on average, is acquired earlier. In other words, it is thought that a sound which is difficult for an articulation disordered-child to pronounce may be easier to pronounce the lower the value of the age of acquisition for that word is. Accordingly, the difficulty of practice can be set lower by setting the age of acquisition within a smaller range of values, and the difficulty of practice can be set higher by setting the age of acquisition within a greater range of values. Accordingly, providing this option bar makes it possible to easily set the difficulty of the practice. In a default state, the search condition settings and the display which makes the set search condition visually-recognizable are the same as for the appearance number option bar.

[Text Variation Number Option Bar]

The text variation number option bar (also called a "text variation number setting field" hereinafter) is an element for designating a number of variations on words within a book including a speech sound set as a search target sound appears, and is, for example, a slider bar through which a minimum value and a maximum value can be designated, as illustrated in FIG. 9 and FIG. 10.

When, in the book used for practice, the number of variations on a word containing the speech sound set as the search target sound is low, a child may only become able to pronounce the speech sound set as the search target sound for that small number of words. On the other hand, when, in the book used for practice, the number of variations on a word containing the speech sound set as the search target sound is high, the practice may become too difficult and put an excessive and unbearable burden on the articulation disordered-child. Accordingly, providing this option bar makes it possible to make settings which take into account the balance between the effectiveness and the difficulty of the practice. In a default state, the search condition settings and the display which makes the set search condition visually-recognizable are the same as for the appearance number option bar.

[Option Graph Rendering Field]

Note that instead of at least one of the above-described option bars, the option area may include a graph rendering field in which a line on a two-dimensional plane can be designated (called an "option graph rendering field" hereinafter).

For example, if the option graph rendering field is for the appearance number, a two-dimensional graph that takes the horizontal axis as the appearance number and the vertical axis as a weighting value for each appearance number may be provided, and the user may then be able to draw a line on the two-dimensional graph using the input unit 200, which is a mouse, a touch panel, or the like. The control unit 110 may then detect the line input to the two-dimensional graph through the input unit 200, and include the combination of the appearance number and weighting value corresponding to that line in the search condition.

[Search Button Arrangement]

In the book search apparatus according to the present embodiment, a book is searched for after at least one of an option button, an option bar, or the option graph rendering field has been used to make a designation in the option area. Accordingly, the search button 305 may be included within the option area, as illustrated in FIG. 9 and FIG. 10. Note that when the search button is included within the option area, the configuration may be such that the search button is not provided outside of the option area. The same applies to the past condition search button.

[Other Modifications, Etc.]

Figure 11:
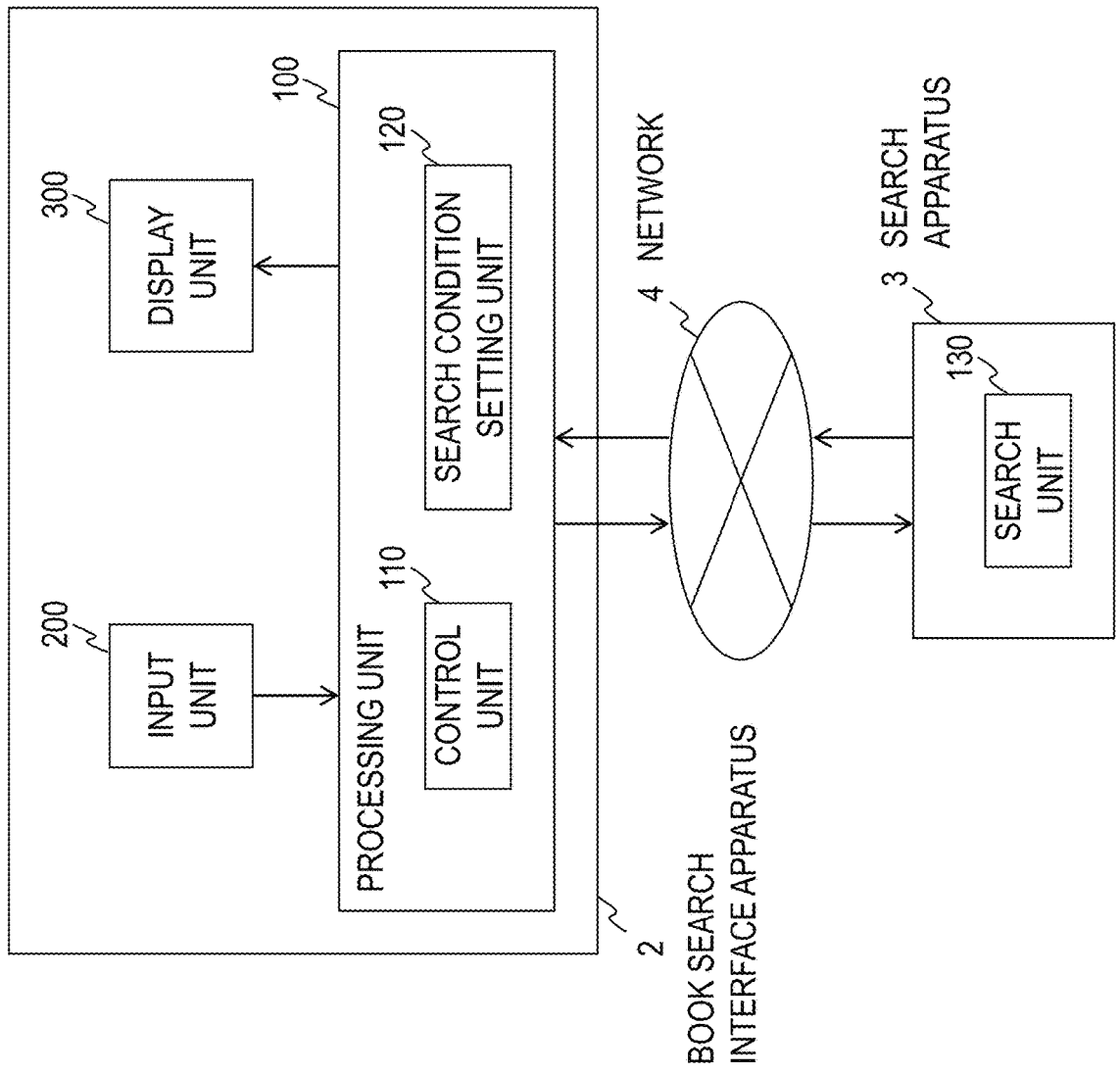
FIG. 11 is a diagram illustrating an example of the functional configurations of a book search interface apparatus and a search apparatus according to a modification.

Note that the present invention is not limited to the foregoing embodiments. For example, although the foregoing embodiments describe a case where the language is Japanese, the present invention can be applied to another language, as long as the language is one in which symbols using text correspond to the details of pronunciation. Additionally, the functions, data, and so on of the processing unit 100 may be distributed throughout a plurality of devices, and those devices may execute the above-described processing by exchanging information with each other over the Internet or the like. To be more specific, as illustrated in FIG. 11, the search unit 130 may be provided within a search apparatus 3, and a book search interface apparatus 2 according to the present invention, which does not include the search unit 130 but does include the processing unit 100, the input unit 200, and the display unit 300, may connect to the search apparatus 3 over a network 4.

When the above-described configuration is implemented by a computer, the processing details of the functions which the apparatus is to have are written in a program. The above-described functions are implemented by the computer as a result of the computer executing the program. The program in which the processing details are written can be recorded into a computer-readable recording medium. A non-transitory recording medium is an example of a computer-readable recording medium. Magnetic recording devices, optical disks, magneto-optical recording media, semiconductor memory, and the like are examples of such a recording medium.

The program is distributed by, for example, selling, transferring, or lending portable recording media such as DVDs and CD-ROMs in which the program is recorded. Furthermore, the configuration may be such that the program is distributed by storing this program in a storage device of a server computer and transferring the program from the server computer to another computer over a network.

A computer executing such a program first stores the program recorded on the portable recording medium or the program transferred from the server computer in its own storage device, for example. When executing the processing, the computer reads the program stored in its own storage device and executes the processing in accordance with the read program. As another way to execute the program, the computer may read the program directly from the portable recording medium and execute the processing in accordance with the program, and furthermore, each time a program is transferred to the computer from the server computer, processing according to the received programs may be executed sequentially. The configuration may be such that the above-described processing is executed by what is known as an ASP (Application Service Provider)-type service that implements the functions of the processing only by instructing execution and obtaining results, without transferring the program from the server computer to the computer in question.

Rather than implementing the processing functions of the apparatus by executing predetermined programs on a computer, at least some of the processing functions may be implemented by hardware.

REFERENCE SIGNS LIST

1 Book search apparatus
2 Book search interface apparatus
3 Search apparatus
4 Network
100 Processing unit
110 Control unit
120 Search condition setting unit
130 Search unit
200 Input unit
300 Display unit

What is claimed is:

1. A book search interface apparatus that sets a search condition for searching for a Japanese picture book or a Japanese children's book in which a Japanese kana symbol indicating a desired Japanese speech sound appears, in accordance with the set search condition, the desired Japanese speech sound being a detail of pronunciation corresponding to the Japanese kana symbol, the Japanese kana symbol appearing in Japanese language text, the Japanese language text being in Japanese language wherein each unique Japanese language symbol in text corresponds to a unique detail of pronunciation, and wherein the Japanese kana symbol indicates either a hiragana symbol or a katakana symbol, the book search interface apparatus comprising:
a display unit displaying a book search screen; and
an input unit receiving a selection to set the search condition for the desired Japanese speech sound in accordance with a selection state of kana symbol buttons disposed in the book search screen, each of the kana symbol buttons corresponding one-to-one to each of Japanese kana symbols,
wherein the book search screen includes at least:
a Japanese syllabary button group,
an articulation button group in which:
the kana symbol buttons are arranged in a two-dimensional table in which each of several articulatory organs are arranged in a first dimension and each of several articulation manners are arranged in a second dimension,
the articulation button group includes an articulatory organ button that collectively controls the selection state of the kana symbol buttons corresponding to speech sounds related to respective articulatory organs,
each of the kana symbol buttons is arranged at a position of a combination of an articulatory organ and an articulation manner in the two-dimensional table, and
when the selection state of the kana symbol buttons included in at least one button group among the Japanese syllabary button group and the articulation button group has changed, a display of the selection state of the kana symbol buttons that correspond to the same speech sounds as the kana symbol buttons for which the selection state has changed in the other button group, is electronically controlled to change so as to be the same as a display of the selection state of the kana symbol buttons for which the selection state has changed, the combination corresponds to one Japanese speech sound,
the Japanese speech sound is indicated in Japanese kana symbol, and
the Japanese kana symbol corresponds one-to-one to the kana symbol button.

2. The book search interface apparatus according to claim 1, wherein the articulation button group further includes:
an articulation manner button that collectively controls a selection state of the kana symbol buttons corresponding to speech sounds related to respective articulation manners.

3. The book search interface apparatus according to claim 1, wherein,
in the Japanese syllabary button group:
the kana symbol buttons are arranged in the two-dimensional table in which each of several vowels are arranged in the first dimension and each of several consonants are arranged in the second dimension, and
each of the kana symbol buttons is arranged according to a combination of a vowel and a consonant corresponding one-to-one to a kana symbol button.

4. The book search interface apparatus according to claim 1, wherein the book search screen further includes at least one of the following:
a text type setting field that designates a type of text with which the desired speech sound is written in the book;
an in-word appearance location setting field that designates a location where the desired speech sound appears in a word appearing in the book;
an in-sentence appearance location setting field that designates a location where the desired speech sound appears in a sentence appearing in the book;
a word class setting field that designates a word class of a word in which the desired speech sound appears in the book;
an appearance number setting field that designates a number of times the desired speech sound appears in the book;
a mora number setting field that designates a number of moras in a word in which the desired speech sound appears in the book;
a familiarity setting field that designates a familiarity of a word in which the desired speech sound appears in the book;
an acquisition age setting field that designates an age of acquisition for a word in which the desired speech sound appears in the book; and
a text variation number setting field that designates a number of variations of a word in which the desired speech sound appears in the book.

5. A book search method comprising:
setting a search condition for a Japanese speech sound in accordance with a selection state of kana symbol buttons disposed in a book search screen, each of the kana symbol buttons corresponding one-to-one to each of Japanese kana symbols indicating each Japanese speech sound; and
searching for a Japanese picture book or a Japanese children's book in which a Japanese kana symbol indicating a desired Japanese speech sound appears, in accordance with the set search condition,
wherein the desired Japanese speech sound being a detail of pronunciation corresponding to the Japanese kana symbol, the Japanese kana symbol appearing in Japanese language text, the Japanese language text being in Japanese language wherein each unique Japanese language symbol in text corresponds to a unique detail of pronunciation, and wherein the Japanese kana symbol indicates either a hiragana symbol or a katakana symbol, the book search screen includes at least:
- a Japanese syllabary button group;
- an articulation button group in which:
  - the kana symbol buttons are arranged in a two-dimensional table in which each of several articulatory organs are arranged in a first dimension and each of several articulation manners are arranged in a second dimension,
  - the articulation button group includes an articulatory organ button that collectively controls the selection state of the kana symbol buttons corresponding to speech sounds related to respective articulatory organs,
  - each of the kana symbol buttons is arranged at a position of a combination of an articulatory organ and an articulation manner in the two-dimensional table,
  - when the selection state of the kana symbol buttons included in at least one button group among the Japanese syllabary button group and the articulation button group has changed, a display of the selection state of the kana symbol buttons that correspond to the same speech sounds as the kana symbol buttons for which the selection state has changed in the other button group, is electronically controlled to change so as to be the same as a display of the selection state of the kana symbol buttons for which the selection state has changed,
  - the combination corresponds to one Japanese speech sound,
  - the Japanese speech sound is indicated in Japanese kana symbol, and
  - the Japanese kana symbol corresponds one-to-one to the kana symbol button.

6. The book search method according to claim 5, wherein, in the Japanese syllabary button group, the kana symbol buttons are arranged in the two-dimensional table in which each of several vowels are arranged in the first dimension and each of several consonants are arranged in the second dimension, and
each of the kana symbol buttons is arranged according to a combination of a vowel and a consonant corresponding one-to-one to a kana symbol button.

7. The book search method according to claim 5, wherein the book search screen further includes at least one of the following:
- a text type setting field that designates a type of text with which the desired speech sound is written in the book;
- an in-word appearance location setting field that designates a location where the desired speech sound appears in a word appearing in the book;
- an in-sentence appearance location setting field that designates a location where the desired speech sound appears in a sentence appearing in the book;
- a word class setting field that designates a word class of a word in which the desired speech sound appears in the book;
- an appearance number setting field that designates a number of times the desired speech sound appears in the book;
- a mora number setting field that designates a number of moras in a word in which the desired speech sound appears in the book;
- a familiarity setting field that designates a familiarity of a word in which the desired speech sound appears in the book;
- an acquisition age setting field that designates an age of acquisition for a word in which the desired speech sound appears in the book; and
- a text variation number setting field that designates a number of variations of a word in which the desired speech sound appears in the book.

8. A non-transitory computer-readable recording medium on which a program recorded thereon for causing a computer to function as the book search interface apparatus according to claim 1.

* * * * *